United States Patent [19]

Goto et al.

[11] Patent Number: 4,883,632
[45] Date of Patent: Nov. 28, 1989

[54] METHOD FOR SHAPING THERMOPLASTIC FABRICS

[75] Inventors: Fumio Goto; Taro Otawa, both of Kurashiki, Japan

[73] Assignee: Namba Press Works Co., Ltd., Kurashiki, Japan

[21] Appl. No.: 265,671

[22] PCT Filed: Feb. 19, 1988

[86] PCT No.: PCT/JP88/00176

§ 371 Date: Oct. 21, 1988

§ 102(e) Date: Oct. 21, 1988

[87] PCT Pub. No.: WO88/06198

PCT Pub. Date: Aug. 25, 1988

[30] Foreign Application Priority Data

Feb. 23, 1987 [JP] Japan ................. 62-038154

[51] Int. Cl.⁴ ............................................. B29C 51/42
[52] U.S. Cl. ...................................... 264/544; 264/512; 264/546; 264/570; 264/316; 425/387.1
[58] Field of Search ............. 264/510, 512, 544, 546, 264/547, 552, 570, 316; 425/387.1

[56] References Cited

U.S. PATENT DOCUMENTS

| | | | |
|---|---|---|---|
| 2,342,988 | 2/1944 | Vidal | 264/316 |
| 2,760,233 | 8/1956 | Bjorksten | 264/512 |
| 3,439,078 | 4/1969 | Whiteford | 264/570 |
| 3,741,724 | 6/1973 | Harmon | 264/546 |
| 4,036,924 | 7/1977 | Shishoo et al. | 264/546 |

FOREIGN PATENT DOCUMENTS 51-132163 11/1976 Japan .
60-189419 9/1985 Japan .

*Primary Examiner*—Jill L. Heitbrink
*Attorney, Agent, or Firm*—Renner, Kenner, Greive, Bobak, Taylor & Weber

[57] ABSTRACT

A method for shaping thermoplastic fabrics such as those made of polyester or polyamide fibers into desired three dimensional configurations through a simple procedure. Thermoplastic fabrics are immersed into hot liquid metallic bath made of eutectic metals such as lead, tin, cadmium, zinc and bismuth and formulated to have the eutectic point at least equal to or higher than the softening point of the thermoplastic fibers and lower than the melting point of the fibers. This metallic bath may be called "fluidic lower mold." The thermoplastic fabrics are immersed into the fluidic lower mold by means of an upper mold or core member having desired outer configurations substantially corresponding to those of final products, for example, headrest or seat cushion. The upper mold pushes down the fabric preferably along with a protective sheet laid beneath the fabric into the metallic bath. Immersed fabrics receive high compressive forces and heat from the hot liquid metallic bath, and thus can easily and rapidly be shaped around the upper mold, so to speak, at a single shot.

11 Claims, 2 Drawing Sheets

METHOD FOR SHAPING THERMOPLASTIC FABRICS

TECHNICAL FIELD

This invention relates to a method for shaping thermoplastic fabrics, and more particularly a method for shaping thermoplastic fabrics composed of, e.g., polyester or polyamide fibers, or thermoplastic films of similar nature, into three diemensional configurations using a hot liquid metallic bath.

BACKGROUND ART

It is well known that certain thermoplastic fibers such as polyester or polyamide (nylon 6 and 66) have both crystalline regions and non-crystalline (amorphus) regions therein. The non-crystalline region has the softening point lower than the melting point of the crystalline region. When the thermoplastic fibers of this nature are heated up to the softening point of the non-crystalline region, the fibers will not lose their integrity as fiber since the crystalline regions yet remain in their original shapes. However, if heated up to or over the melting point of the crystalline regions, the fibers will melt as a whole and lose their original shapes,i.e., will be broken. In the apparel industry,.this physical property of the thermoplastic fibers such as polyester and polyamide is advantageously utilized for imparting so-called "permanent press" or permanent pleats to clothing. In addition, this property of the thermoplastic fibers is utilized in the textile industry to set the fabric made of these thermoplastic fibers in a flattened and wrinkle-free condition through heat setting procedure in order to permit following finishing processes to be done easily and adequately on the flattened fabric.

In another aspect, such thermoplastic fabric can be used to form cover materials for foamed plastic articles such as automobile seats, seat cushions, headrests, armrests, or stuffed toys or dolls. In the prior art technique, the cover material can be formed by cutting the fabric into desired shape and size, assembling pieces of cut fabric and sewing the same into a desired contour for a final product to be obtained. These procedures such as cutting, assembling and sewing the fabric to form the cover material capable of covering desired configurations of a final product are rather complicated, cumbersome, time-consuming and hence expensive. From the industrial and commercial view point, it is highly desirable that a method is provided capable of shaping such thermoplastic fabric or film in a flattened condition into desired three dimensional configurations through a single and simple procedure for heating and pressing.

Specifically, a method for fabricating automobile seats or headrests of the prior art comprises laying a cover fabric in a shaping mold having cavity surfaces corresponding to a final product's contour, mating the fabric with the cavity surfaces through vacuuming from the outside, and pouring fluid polyurethane formulations onto the fabric configured as above, and allowing the formulations to foam and expand until it adheres to the inside surface of the fabric. In this method of the prior art, permeable material such as ordinary textile fabric can not be used as cover material because its permeability renders vacuuming procedure inoperable. Such permeable fabric must have impermeable backings applied thereto if employed in the vacuum shaping process. Applying backings to the cover material is, again, cumbersome and expensive operations. Further, final products covered by such impermeable materials are void of comfortableness in use because they can not absorb sweat or other moisture deposited on their surfaces. Moreover, forming the cover material into desired configurations corresponding to the final contours through vacuuming is not so simple and easy that unintended and undesirable malformation may occur in the cover material before pouring polyurethane fluid thereonto causing inferior goods to be produced in many instances.

Apart from vacuum shaping process, a specially designed apparatus having means for heating and pressing the cover material would be required in order to shape the same into desired three dimensional configurations. Such apparatus, however, must be provided individually for different shapes and sizes of the final products and can not be used for manufacturing different products, e.g., automobile seats on one hand, and headrests on the other hand. Individual provisions of shaping apparatus for every different product require excessive investment and is unacceptable to the industry.

Thus, such thermoplastic fabrics as polyester and polyamide, though having good thermal properties as mentioned above, have not fully been developed to their potential abilities such that they can be processed from their flattened states through the single and simple heating and pressing step into desired final configurations, nor a method for performing such process developed.

DISCLOSURE OF THE INVENTION

Accordingly, it is an object of the invention to provide a method capable of shaping thermoplastic fabrics in flattened states into desired three dimensional configurations through a single heating and pressing step.

It is another object of the invention to provide an apparatus employed for performing such method as described above.

The method and apparatus of the invention can be used for manufacturing various products of different shapes and sizes through minor changes in its components, and has a high versatility and economy in investment.

In brief, the method according to the invention comprises immersing thermoplastic fabrics or films composed of such materials as polyester and polyamide having both crystalline and non-crystalline regions therein into a liquid metallic bath having an eutectic point which is substantially equal to or higher than the softening point of the non-crystalline region of those materials and is lower than the melting point of those materials thereby to impart to those materials heat and pressure from the metallic bath to form and shape the fabrics or films into desired three dimensional configurations corresponding to contours of the final product. In this specification, both thermoplastic fabrics and films are referred to generically as "thermosplastic fabrics" hereinafter.

In immersing the thermoplastic fabric, a core member is employed which has three dimensional configurations substantially corresponding to those of the final product to be obtained, e.g.,headrest or seat cushion. This core may be called an "upper mold" in contrast to the metallic bath which may be called a "fluidic lower mold." The core or upper mold member is made of material which is durable to heat and pressure exerted by hot and compressive molten metallic bath, and is preferably inexpensive, such as concrete. If a cover material of different shape and/or size is to be shaped, only the upper mold need be replaced accordingly, and the lower mold, i.e.liquid metallic bath can be inveriably utilized over a wide range of different products without any change.

In order to protect thermoplastic fabrics from being soiled or damaged through direct contact with molten hot metal mixtures, a protective sheet or fabric should be employed to cover and shield the fabrics from the metallic bath. Protective sheet may be made of material which has sufficiently close and firm texture for preventing molten metallic mixtures from penetrating therethrough, and yet which is resilient and susceptible to transfer heat and pressure to the fabric to be shaped from the hot liquid metallic bath. Preferred materials to be used for the protective sheet in the invention include knitted fabric made of polypropylene fibers sold under the trademark Meraklon.

The thermoplastic fabric is disposed in a wrinkle-free flattened condition on the protective sheet spread out over the liquid metallic bath. Then, the fabric together with the protective sheet is pushed down by the descending upper mold into the metallic bath to a required depth in the bath. The metallic bath, having eutectic point of, e.g., 139° C. or more and being heated to a temperature higher than the eutectic point and lower than the melting point of crystalline region of the thermoplastic fabric, imparts to the same heat corresponding to that temperature and, at the same time, strong compressive forces resulted form the density of the molten metal and the depth at which the fabric is immersed. Thus, the thermoplastic fabric is heated and pressed so as to follow accurately the outer contour of the upper mold.

When the fabric is sufficiently shaped, the upper mold holding the shaped fabric therearound is taken out from the bath, after which the fabric is subjected to a cooling step to thereby fix the fabric in its given three dimensional configurations. As the fabric thus shaped has some degree of flexibility, the upper mold can easily be withdrawn from the enveloping shaped fabric thereby to produce a hollow, three-dimensionally shaped cover fabric.

PREFERRED EMBODIMENT FOR CARRYING OUT THE INVENTION

Figure 1:
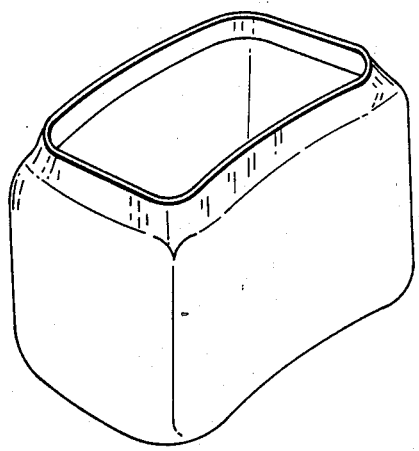
FIG. 1 shows a hollow cover material formed and shaped according to the invention for use in manufacturing headrest.

Referring now to the drawings, the invention will be described in respect of its product, i.e. a shaped cover fabric shown in FIG. 1, and in respect of a method for manufacturing the shaped cover fabric in conjunction with FIGS. 2 and 3.

The method of the invention can produce various shaped articles from the thermoplastic fabric among which is included a shaped cover fabric for a headrest of the chair or seat as shown in FIG. 1. Into this cover fabric, foamed polyurethane or other paddings will be charged to produce a desired final product. The cover fabric shown in FIG. 1 is made of a woven or nitted fabric or polyester or polyamide fibers. Initially, the fabric is in a flattened state and has no capability to retain itself in a three dimensional configuration. When treated in the process of the invention, the fabric acquires shape retentivity by itself in a three dimensional shape as shown in FIG. 1. The final product, i.e., headrest in this case, can be easily and economically manufactured by merely pouring into this shaped cover liquid or creamy substances, such as polyurethane, foamable with low pressure produced and allowing the substances to foam and expand to the full extent of the volume of the hollow shaped cover.

Figure 2:
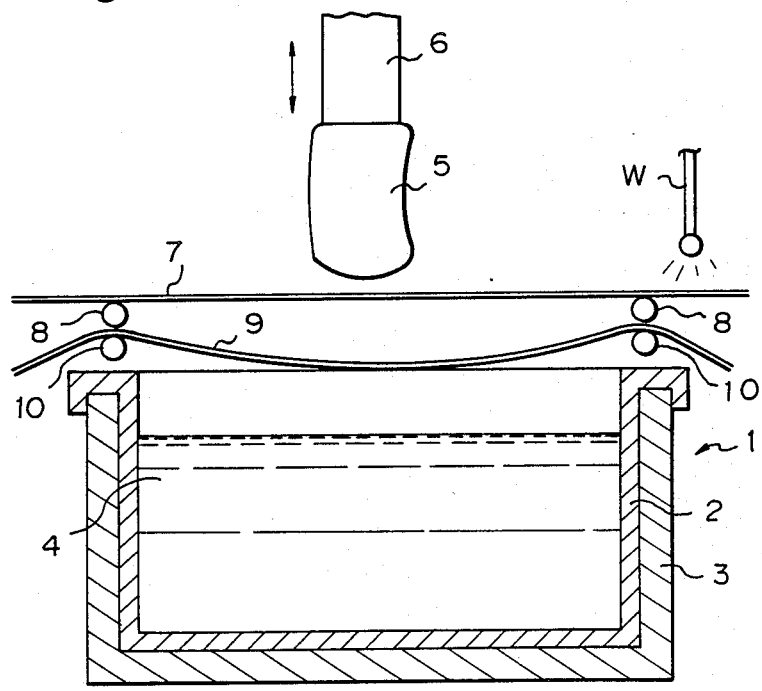
FIG. 2 illustrates a schematic sectional view of a shaping apparatus used for carrying out a method of the invention of which main part comprises liquid metallic bath.
Figure 3:
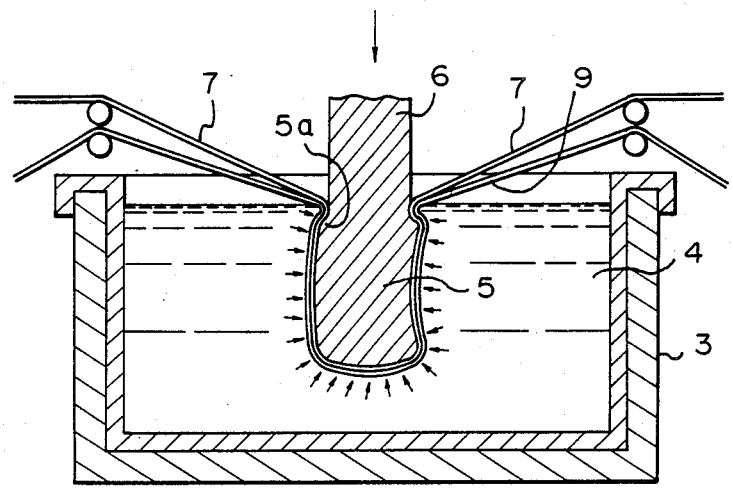
FIG. 3 shows a heating and pressing process performed in the apparatus of FIG. 2.

Referring now to FIGS. 2 and 3, the method for manufacturing the pre-shaped cover material of the invention will be described.

A shaping apparatus 1 according to the invention is illustrated in FIG. 2 which comprises an inner refractory wall 2, an outer rigid sheell or vessel 3, and hot liquid metallic bath 4 contained therein.

The liquid metallic bath of the invention is composed of an eutectic mixture comprising metals selected from the group consisting of lead, tin, cadmium, zinc and bismuth. Practically, the eutectic mixture may be of binary, tertiary or quaternary mixtures from the foregoing 5 (five) metals. These metals all have high density and hence are able to exert, not only heat, but also high and strong compressive forces against the material immersed therein.

A preferable formulation for the metallic bath 4 is as follows:

| Components | % by weight |
|---|---|
| lead | 32 |
| tin | 45 |
| cadmium | 18 |
| bismuth | 5 |

This preferable formulation can form a liquid eutectic mixture at 139° C. and have a highest density, which can apply uniform compressive or shaping forces against an object immersed therein and high heat energy at least equal to 139° C. to that object. The compressive shaping forces are resultant from, on one hand, the density of liquid metal which is deemed substantially constant, say about 10 in case of the above-mentioned formulation, and, on the other hand,the depth at which the object is immersed in the liquid metal. For instance, at 10 cm deep in the illustrated metallic bath 4, a compressive shaping force of about 100 g/cm$^2$ can be attained. Preferably, means for heating and maintaining the metallic bath in liquid state may be provided on the vessel 3. Thus, the liquid metallic bath may be called a fluidic or flexible lower mold for shaping purposes.

The shaping apparatus 1 further comprises an upper mold or core member 5 movable from upward down into the bath 4. Upper mold 5 has outer configuration substantially corresponding to contours of a desired final product, e.g., headrest in the example shown. Against and around the outer surfaces of the mold 5 can be compressed any thermoplastic fabric under the influences of heat and pressure transferred from the liquid metal 4. The upper mold 5 is made from heat-and-pressure-resistant and relatively inexpensive material, such as preferably concrete, which would not undergo thermal expansion and cracking even under the influence of high heat and pressure exerted from the liquid metallic bath 4. The mold 5 is movably supported by a suitable hanging support member 6 as shown in FIG. 2.

A thermoplastic fabric 7 to be shaped into three dimensional configuration according to the invention is spread out in a flattened state below the upper mold 5 and over the bath 4. The fabric 7 may be knitted or woven fabric of polyester or polyamide fibers, or thermoplastic films of similar nature. In FIG. 2, the fabric 7 is supported in a tensioned and wrinkle-free condition on guide rollers 8 and it can be freely moved down into the bath 4 by downward forces exerted by descending mold 5.

A protective fabric or sheet 9 is positioned over the bath 4 and beneath the fabric 7 by means of guide rollers 10 on which the sheet 9 together with the fabric 7 can freely be moved. The protective sheet 9, serving to protect the fabric 7 to be shaped from being soiled or damaged by direct contact with liquid metal 4, should also have good thermal conductivity and resiliency enough to transfer heat and pressure from the bath 4 to the fabric 7 with minimum losses threrethrough. In this respect, knitted fabric of polypropylene fibers sold under the trademark MERAKLON is deemed preferable for the protective sheet 9.

Means for applying water to the fabric 7 is disposed over the fabric and designated by reference character W in FIG. 2. Means W is movable horizontally over the fabric 7. Alternatively, the fabric 7 may be moved horizontally under the fixed water supply W.

The process for shaping the thermoplastic fabric is started by setting fabric 7 in the flattened condition as in FIG. 2 and then lowering upper mold 5 against the fabric 7. Descending mold 5 causes fabric 7 and protective sheet 9 to be immersed gently in the liquid metallic bath 4. As shown in FIG. 3, descending of mold 5 is continued until it reaches a desired depth, for example, at which a neck portion 5a of mold 5 is submerged beneath the surface of the bath 4. Neck portion 5a substantially corresponds to a bottom portion of a final product, i.e., headrest in this case. If greater shaping compressive forces are to be attaiined in the bath 4, then upper mold 5 may be immersed in deeper location.

Thermoplastic fabric 7 immersed in the bath 4 receives compressive forces as indicated by a plurality of minute arrows in FIG. 3 substantially evenly on its entire surface and is forced to follow the outer configurations of mold 5. At the same time, the fabric 7 is heated by the bath 4 at least to the eutectic point of the bath 4, e.g., 139° C. to cause its non-crystalline zones to be melted or at least softened.

The fabric 7 thus shaped by heat and pressure is then withdrawn from the bath 4 along with protective sheet 9 and cooled down as by blowing cold air thereagainst so as to fix its given three dimensional shape. The protective sheet 9 is reusable many times until it is broken.

When the given three dimensional shape is fixed, the upper mold 5 is withdrawn from within the shaped fabric. As the shaped fabric has some degree of resiliency, it allows the main portion of mold 5 to be withdrawn through its necked portion without any difficulty and feat to destroy the given shape of the fabric. Then, cutting is made at or slightly above the necked portion of the now hollowed fabric 7 to thereby produce the three-dimensionally shaped hollow cover material for the headrest as shown in FIG. 1.

According to the invention, thermoplastic fabric 7 may be preliminarily applied with moisture as through means W shown in FIG. 2 for easy shaping. Upon immersing the fabric in the hot bath 4, moisture impregnated therein will be rapidly changed to steam and cause the fibers to be swollen whereby the fibers become more easily shaped. After hot shaping, the fabric is in dried condition and no moisture exists therein.

In case that the woven or knitted fabric of polyester or poly amide fibers are to be shaped according to the invention, it should be advantageously one which has not experienced heat setting procedure because it has less stresses or strains in its non-crystalline regions which otherwise would result from preliminary heat setting process. Thermoplastic fabrics not subjected to preliminary heat set are more susceptible to be shaped into desired configurations under heat and pressure from the liquid metallic bath. Dyeing and various finishing operations other than heat setting are permitted to be done on the thermoplastic fabric to be treated according to the invention.

Figure 4:
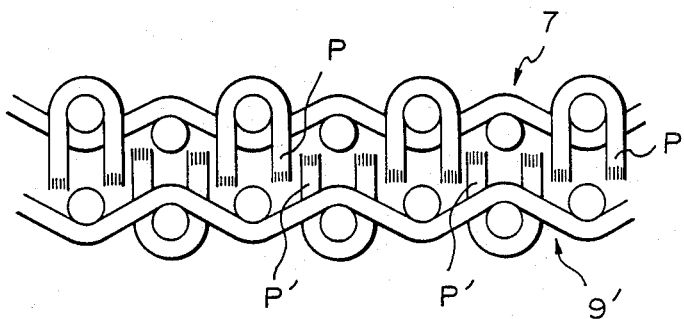
FIG. 4 is a diagramatical enlarged view of a protective sheet employed in the heating and pressing process for protecting thermoplastic fabrics from being damaged by direct contact with the liquid metallic bath.

In case that a pile fabric is to be treated by the method of the invention, it should be protected by a protective sheet 9' having the same piles on its surface as schematically illustrated in FIG. 4. The piled protective sheet 9' has a plurality of piles P' which are opposed to and inserted among the piles P of the fabric 7. Thus, the piles P will not be so hardly crushed during heating and pressing procedure by the hot liquid metalic bath 4 and the fabric 7 can well retain virtually its softness in touch.

The method for shaping by means of liquid metallic bath of the invention can also be applied to thermoplastic films, which heretofore have been shaped or molded through the use of heating apparatus and/or vacuum molding apparatus. By utilizing the liquid metallic bath process of the invention, such films can be economically and advantageously shaped through the single immersing process. In the apparatus used heretofore, numerous molds for shaping the fabrics must be provided for every product of different size and shape including both upper and lower molds. Moreover, the vacuum molding machine itself used heretofore is essentially very expensive as it consists of many complicated components and other accessories.

In contrast, the single and simple liquid metallic bath of the invention is applicable as a common lower mold with respect to many products of different size and shape, and only the upper mold or core member need be replaced for adaptation to different size and shape. Moreover, the upper mold of the invention can be made from easily available and relatively inexpensive materials such as, for example, concrete.

Advantages attained by the fluidic lower mold (metallic bath) of the invention reside in that the liquid metal can easily follow any concaved or recessed portions formed by the upper mold surface, and that it can apply both heat and pressure to the fabric to be shaped without necessity for complicated and expensive pressurizing or vacuuming apparatus and heating blocks usually needed separately from the pressurizing apparatus. Even if the upper molds of the invention have enlarged base portions such as inverted V shape molds, they can be smoothly immersed into the lower mold and withdrawn therefrom without substantial resistance as the lower mold is highly flexible and easily deformable.

In addition, in case that thermoplastic films are to be shaped according to the invention, cover materials of more uniform thickness than heretofore obtained can be produced as the films immersed in the metallic bath receive evenly and uniformly compressive forces around their entire surface.

From the foregoing description, it will be noted that woven and knitted fabrics as well as films made of thermoplastics such as polyester and polyamide can be processed from their original flattened states through the single heat-and-pressure-applying step into desired three dimensional configuration. The method and the apparatus according to the invention exhibits a high degree of versatility and is far more economical than that heretofore used. Cumbersome operations such as cutting fabrics, assembling cut pieces of fabric, and sewing them into desired shape can totally be omitted by this invention, and subsequent operations such as pouring polyurethane fluid into the pre-shaped covers can be easily performed as the preshaped covers have shape retentivity by themselves.

What is claimed is:

1. A method for shaping thermoplastic fabrics comprising:
   (a) preparing a cover material from fabrics composed of fibers having both crystalline and non-crystalline regions therein, or thermoplastic films,
   (b) providing a liquid metallic bath comprising eutectic mixtures of metals and having an eutectic point at least equal to or higher than the softening point of said non-crystalline regions or said thermoplastic films, and lower than the melting point of said crystalline regions or said films, and said metallic bath being heated to a temperature higher than the eutectic point and lower than the melting point of said crystalline regions or said films, said metallic bath having relatively high density,
   (c) using an uppr mold having three dimensional outer configurations substantially corresponding to outer contours of final products to be obtained for pushing down and immersing said cover materials into said liquid metallic bath to thereby cause said cover material to follow the outer configurations of said upper mold and be shaped accordingly,
   (d) taking out the shaped cover material from said bath along with said upper mold, and cooling said cover material, and
   (e) withdrawing said upper mold from the inside of said shaped cover material.

2. A method as claimed in claim 1 wherein a protective sheet is employed between said cover material and said liquid metallic bath.

3. A method as claimed in claim 1 wherein said fabrics composed of fibers are moistened prior to immersing the same into said bath.

4. A method as claimed in claim 1 wherein cooling is done by blowing air to said cover material taken out from said bath.

5. A method as claimed in claim 1 wherein said liquid metallic bath comprises eutectic mixtures of the metals selected from the group consisting of lead, tin, cadmium, zinc and bismuth.

6. A method as claimed in claim 5 wherein said liquid bath comprises an eutectic mixture composed of lead, tin, cadmium and bismuth and having an eutectic point of 139° C.

7. A method as claimed in claim 2 wherein said protective sheet is a knitted fabric having close texture made of polypropylene fibers.

8. A method as claimed in claim 1 wherein said upper mold is of concrete block.

9. A method as claimed in claim 1 wherein said cover material is woven or knitted fabrics of polyester or polyamide fibers.

10. A method as claimed in claim 2 wherein said cover material is a pile fabric and said protective sheet is a piled material having opposing piles on its surface toward said pile fabric.

11. A method as claimed in claim 1 wherein said cover material is a thermoplastic film.

* * * * *

UNITED STATES PATENT AND TRADEMARK OFFICE
CERTIFICATE OF CORRECTION

PATENT NO. : 4,883,632

DATED : November 28, 1989

INVENTOR(S) : FUMIO GOTO and TARO OGAWA

Page 1 of 2

It is certified that error appears in the above-identified patent and that said Letters Patent is hereby corrected as shown below:

```
Cover page, [75], "Otawa" should read -- Ogawa --.

Column 3, line, 4, "inveriably" should read
-- invariably --.

Column 4, line 8, "fabric or" should read -- fabric of --.

Column 4, line 25, "sheell" should read -- shell --.

Column 4, line 27, "bath of" should read -- bath 4 of --.

Column 4, line 64, "configuration" should read
-- configurations --.

Column 5, line 2, "heatand-" should read -- heat-and- --.

Column 5, line 27, "threrethrough" should read
-- therethrough --.

Column 5, line 47, "attaiined" should read -- attained --.

Column 5, line 67, "feat" should read -- fear --.

Column 7, line 14, "configuration." should read
-- configurations. --
```

UNITED STATES PATENT AND TRADEMARK OFFICE
CERTIFICATE OF CORRECTION

PATENT NO. : 4,883,632

DATED : November 28, 1989

INVENTOR(S) : Fumio Goto and Taro Ogawa

It is certified that error appears in the above-identified patent and that said Letters Patent is hereby corrected as shown below:

Column 7, line 22, "preshaped" should read -- pre-shaped --.

Signed and Sealed this

Fourth Day of May, 1993

Attest:

MICHAEL K. KIRK

*Attesting Officer*     *Acting Commissioner of Patents and Trademarks*